United States Patent [19]

Eguchi et al.

[11] Patent Number: 4,725,513
[45] Date of Patent: Feb. 16, 1988

[54] ELECTROLUMINESCENT DEVICE

[75] Inventors: Ken Eguchi, Yokohama; Haruki Kawada, Kawasaki; Yukuo Nishimura, Sagamihara, all of Japan

[73] Assignee: Canon Kabushiki Kaisha, Tokyo, Japan

[21] Appl. No.: 21,610

[22] Filed: Mar. 3, 1987

Related U.S. Application Data

[63] Continuation of Ser. No. 759,884, Jul. 29, 1985, abandoned.

[30] Foreign Application Priority Data

| Jul. 31, 1984 | [JP] | Japan | 59-158886 |
| Jul. 31, 1984 | [JP] | Japan | 59-158892 |
| Aug. 7, 1984 | [JP] | Japan | 59-164231 |
| Aug. 7, 1984 | [JP] | Japan | 59-164232 |

[51] Int. Cl.$^4$ .......................... H01L 29/28; H01J 1/62
[52] U.S. Cl. .................................... 428/690; 428/691; 428/917; 313/502; 313/503; 313/504
[58] Field of Search .................... 428/690, 691, 917; 313/502–504

[56] References Cited

U.S. PATENT DOCUMENTS

| 3,173,050 | 3/1965 | Gurnee | 313/504 |
| 3,382,394 | 5/1968 | Mehl | 313/504 |
| 3,621,321 | 11/1971 | Williams et al. | 313/504 |
| 3,710,167 | 1/1973 | Dresner et al. | 313/504 |
| 3,995,299 | 11/1976 | Partridge | 313/504 X |
| 4,356,429 | 10/1982 | Tang | 313/503 |
| 4,539,507 | 9/1985 | Van Slyke et al. | 313/504 |

FOREIGN PATENT DOCUMENTS 0125278  11/1978  Japan ................... 428/917

*Primary Examiner*—Nancy A. B. Swisher
*Attorney, Agent, or Firm*—Fitzpatrick, Cella, Harper & Scinto

[57] ABSTRACT

An electroluminescent device comprising a luminescent layer is provided. The luminescent layer comprises a mixed monomolecular film of at least one electroluminescent organic compound and at least one organic compound which is different in electro-negativity from said organic compound or a built-up film thereof.

The luminescent layer may be of a double-layer structure wherein a first layer of the luminescent layer comprises a mixed monomolecular film of an electroluminescent organic compound which is electron-acceptable relative to a second layer of the luminescent layer and an organic compound which is electron-acceptable relative to said compound or a built-up film thereof, and the second layer comprises a mixed monomolecular film of an electroluminescent organic compound which is electron-donative relative to the first layer and an organic compound which is electron-donative relative to said compound or a built-up film thereof.

31 Claims, 9 Drawing Figures

ELECTROLUMINESCENT DEVICE

This application is continuation of application Ser. No. 759,884 filed July 29, 1985, now abandoned.

BACKGROUND OF THE INVENTION

1. Field of the Invention

This invention relates to an EL device employing electrical luminescence, namely EL, more particularly to an EL device having a luminescent layer, comprising a thin film of a mixture of at least one electroluminescent organic compound and at least one organic compound different in electronegativity from said organic compound where the compounds are arranged in a high order of molecular orientation, and further to an EL device, having a luminescent layer of a double-layer structure, each layer comprising a thin film of at least one electroluminescent organic compound different in electronegativity relatively to the adjacent layer.

2. Description of the Prior Art

EL devices of the prior art have a luminescent layer comprising a luminescent matrix of ZnS containing Mn or Cu or $ReF_3$ (Re represents a rare earth ion) as an activator, and can be classified into the powder type EL and the thin layer type EL according to the difference in basic structure of said luminescent layer.

Of the devices practically applied, thin layer EL devices give generally higher luminance than the powder type EL, but thin layer EL devices, having a luminescent layer formed by vapor deposition of a luminescent matrix on the substrate, cannot easily be manufactured into a large area device and also have the disadvantage of very high production cost. Accordingly, powder type EL comprising a luminescent matrix, namely ZnS, dispersed in an organic binder, which is most suitable for mass production with low cost, namely about a few tenths of the cost of the thin layer type device, is now attracting attention. Generally speaking, in electrical luminescence, the luminescent characteristic will be improved as the luminescent layer is made thinner. However, in the case of said powder type EL, in which the luminescent matrix consists of discontinuous powder, pinholes are liable to be formed when the luminescent layer is made thinner, and therefore the layer cannot easily be made sufficiently thin, thus involving a serious drawback that no satisfactory luminance characteristic can be obtained. Further, in recent years, an improved device having an intermediate dielectric layer comprising a vinylidene fluoride polymer arranged within the luminescent layer of said powder type EL has been disclosed in Japanese Laid-open Patent Publication No. 172891/1983, but no satisfactory performance with respect to luminance, power consumption, etc. has yet been obtained. On the other hand, quite recently, researches and developments are actively trying to obtain new optical and electronics materials by controlling chemical structures or orderly structures of organic materials, and organic materials comparable with or surpassing metals or inorganic materials have been reported, including EC element, piezoelectric element, pyroelectric element, non-linear optical element, ferroelectric liquid crystal, etc. Thus, while it has been desired to develop a functional organic material as the new functional material surpassing inorganic materials, an EL device having a built-up film of monomolecular layers of an anthracene derivative or a pyrene derivative having a hydrophilic group and a hydrophobic group within the molecule has been proposed in Japanese Laid-open Patent Publication No. 35587/1977. However, those EL devices have not yet attained satisfactory performance as a practical EL device with respect to luminance, power consumption, etc. Further, in the case of said organic EL device, the denisty of carrier electrons or holes is very low, resulting in the very low excitation probability of the functional molecules through recombination of carriers, etc., whereby no efficient luminescence can be expected.

SUMMARY OF THE INVENTION

An object of the present invention is to cancel the drawbacks of the prior art as described above and provide an EL device which can give high luminescence of sufficient luminance at low voltage driving, and can easily be prepared with a low cost.

The above object of the present invention has been accomplished by forming a luminescent layer an EL device by employing a specific combination of materials and forming it into a specific constitution, and by using at least one electroluminescent organic compound and at least one organic compound different in electronegativity from said organic compound in combination as the materials for forming the luminescent layer of EL device, and orientating the above mixed material molecules into a highly ordered structure by employment of the optimum thin layer forming technique, thereby forming the luminescent layer of EL device.

According to an aspect of the present invention, there is provided an EL device, comprising a luminescent layer and a pair of electrodes, wherein said luminescent layer comprises a mixed monomolecular film of at least one electroluminescent organic compound and at least one organic compound which is different in electronegativity from said organic compound or a built-up film thereof.

According to another aspect of the present invention, there is provided an EL device, comprising a luminescent layer of a double-layer structure and a pair of electrodes, wherein a first layer of the luminescent layer comprises a mixed monomolecular film of an electroluminescent organic compound which is electron-acceptable relative to a second layer of the luminescent layer and an organic compound which is electron-acceptable relative to said compound or a built-up film thereof, and the second layer comprises a mixed monomolecular film of an electroluminescent organic compound which is electron-donative relative to the first layer and an organic compound which is electron-donative relative to said compound or a built-up film thereof.

In a further aspect of the present invention, there is provided an EL device, comprising a luminescent layer of a double-layer structure and a pair of electrodes, wherein a layer of the luminescent layer comprises a mixed monomolecular film of an electroluminescent organic compound which is electron-acceptable relative to a second layer of the luminescent layer and an organic compound which is electron-acceptable relative to said compound or a built-up film thereof, and the second layer comprises a mixed deposited film of an electroluminescent organic compound which is electron-donative relative to the first layer and an organic compound which is electron-donative relative to said compound.

In a still further aspect of the present invention, there is provided an EL device, comprising a luminescent layer of a double-layer structure and a pair of electrodes, wherein a first layer of the luminescent layer comprises a mixed deposited film of an electroluminescent organic compound which is electron-acceptable relative to a second layer of the luminescent layer and an organic compound which is electron-acceptable relative to said compound, and the second layer comprises a mixed monomolecular film of an electroluminescent organic compound which is electron-donative relative to the first layer and an organic compound which is electron-donative relative to said compound or a built-up film thereof.

DESCRIPTION OF THE PREFERRED EMBODIMENT

Figure 1:
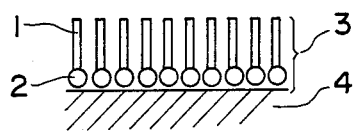
FIG. 1 and FIG. 2 are schematic illustrations of the luminescent layer of the EL device prepared by the LB method of the prior art.

To describe in detail the present invention, the electroluminescent organic compound to be used in the present invention, which characterizes primarily the present invention, is a compound which has a high luminescent quantum efficiency, further a $\pi$ electron system susceptible to external perturbation and can be excited electrically, including, for example, basically, fused polycyclic aromatic hydrocarbons, p-terphenyl, 2,5-diphenyloxazole, 1,4-bis(2-methylstyryl)benzene, xanthine, coumarine, acridine, a cyanine dye, benzophenone, phthalocyanine and its metal complex, porphyrin and its metal complex, 8-hydroxyquinoline and its metal complex, an organic ruthenium complex, an organic rare earth complex and derivatives of these compounds. Further, as the compound which can be an electron acceptor or an electron donor relative to the above compounds, there may be included heterocyclic compounds other than those mentioned above and derivatives thereof, aromatic amines and aromatic polyamines, compounds having a quinone structure, tetracyanoquinodimethane and tetracyanoethylene.

In the present invention, useful compounds for formation of a luminescent layer comprising a deposited film of mixed molecules are selected from the above compounds.

Also, in the present invention, useful compounds for formation of a luminescent layer comprising a mixed monomolecular film or its built-up film are compounds derived by chemically modifying the electroluminescent compounds as mentioned above according to the known methods, as desired, to introduce at least one hydrophobic moiety and at least one hydrophilic moiety (these are all used in the relative sense) in combination into its structure, including, for example, the compounds represented by the formula (I) shown below and other compounds:

$$[(X-R_1)_m Z]_n-\phi-R_2 \qquad (I)$$

wherein X represents hydrogen, halogen, an alkoxy group, an alkyl ether group, a nitro group; a carboxyl group, a sulfonic acid group, a phosphoric acid group, a silicic acid group, a primary to tertiary amino group, and a metal salt thereof, a primary to tertiary amine salt thereof or an acid salt thereof; an ester group, a sulfamide group, an amide group, an imino group, a quaternary amino group and a salt thereof, hydroxyl group; $R_1$ represents a $C_4$–$C_{30}$ alkyl group, preferably a $C_{10}$–$C_{25}$ alkyl group, preferably a straight alkyl group; m is 1 or 2; n is an integer of 1 to 4; Z is direct bonding or a linking group such as —O—, —S—, —NR₃, —CH₂NR₃, —SO₂NR₃, —CO—, —COO—($R_3$ is a hydrogen atom, an alkyl group or an aryl group); $\phi$ is a residue of an electroluminescent compound as exemplified below; $R_2$ is hydrogen or any other substituent similarly as X; at least one of one or a plurality of X, $\phi$ and $R_2$ is a hydrophilic moiety and at least one thereof is a hydrophobic group.

The basic skeletons of the compounds useful for formation of a deposited film of mixed molecules and $\phi$ in the compounds of the formula (I) may include the following [the $\phi$ (basic skeleton) as exemplified below may have substituents in general such as an alkyl group having 1 to 4 carbon atoms, an alkoxy group, an alkyl ether group, a halogen atom, a nitro group, a primary to tertiary amino group, a hydroxy group, a carbamide group, a sulfamide group, etc.].

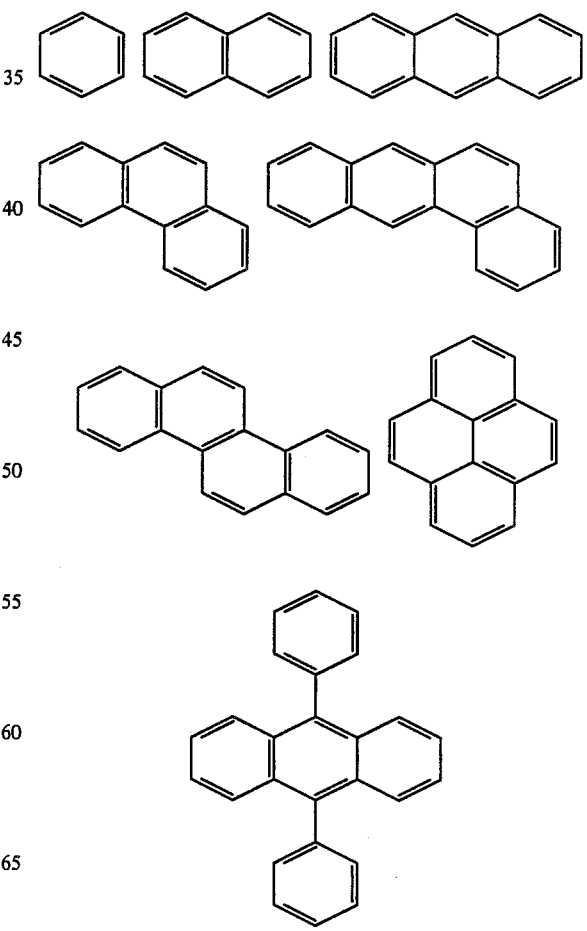

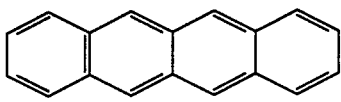
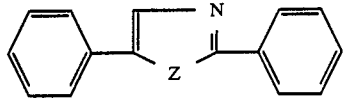
Z = NH, O, S
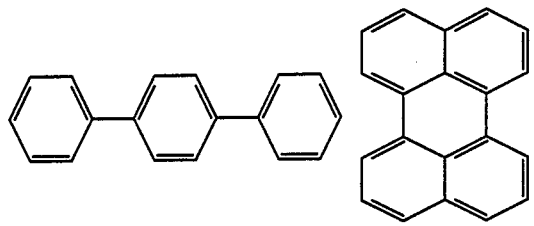
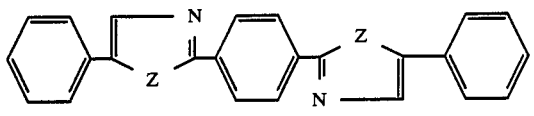
Z = NH, O, S
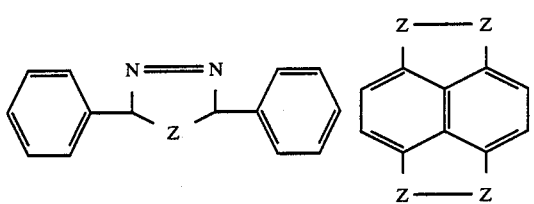
Z = NH, O, S    Z = S, Se
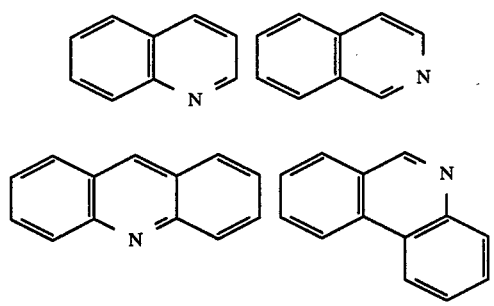
Z = NH, O, S    Z = CO, NH
Z = S, Se
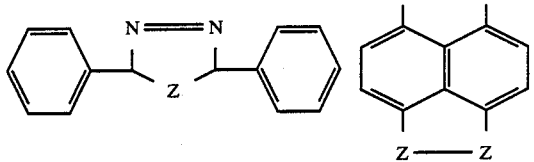
Z = S, Se
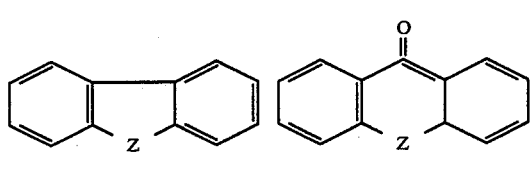
Z = CO, NH, O, S
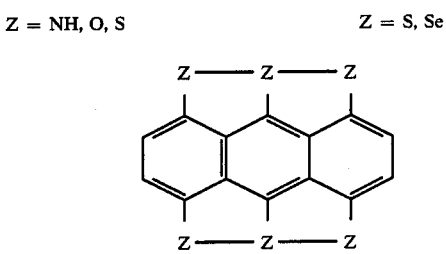
Z = NH, O, S
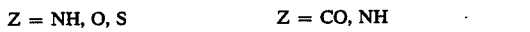
Z = CO, NH, O, S, N—ph    Z = NH, O, S
A = H, ph
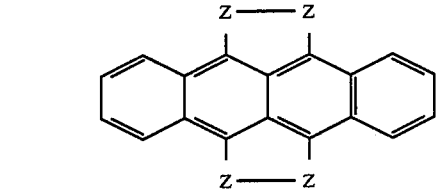
Z = NH, O, S    Z = NH, O, S    Z = NH, O, S
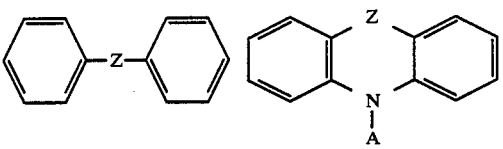
Z = CO, NH, O, S
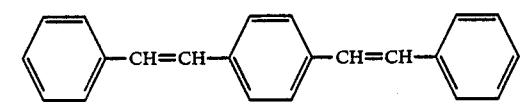

-continued
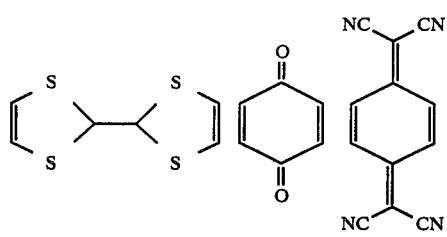
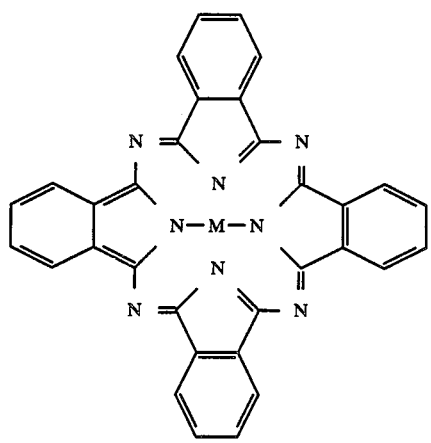
M = Mg, Zn, Sn, AlCl
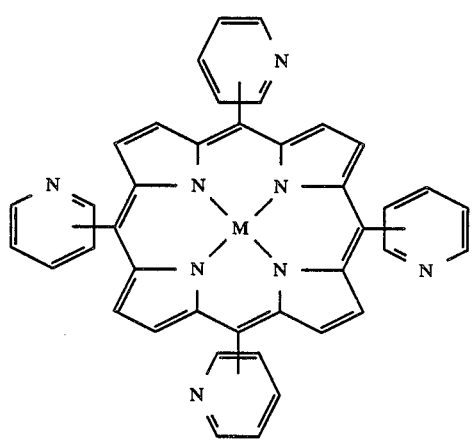
M = H₂, Be, Mg, Ca, Cd Sn, AlCl, YbCl
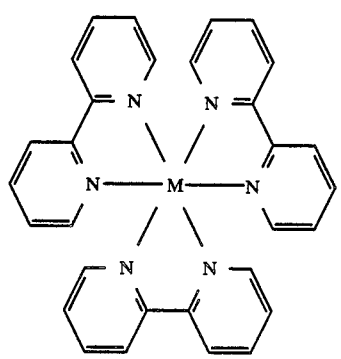
M = Er, Tm, Sm, Eu, Tb, Ru
-continued
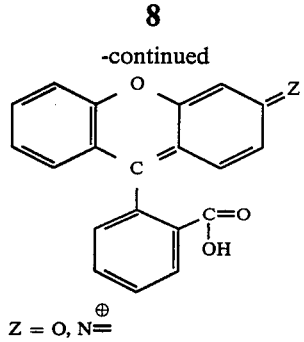
Z = O, N⊕=
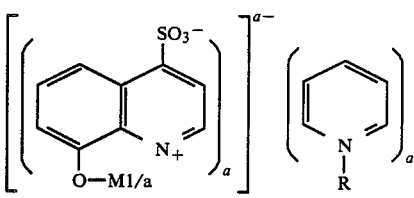
M = Al, Ga, Ir, Ta, a = 3
M = Zn, Cd, Mg, Pb, a = 2
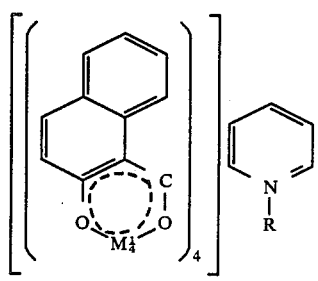
M = Er, Sm, Eu Gd, Tb, Dy Tm, Yb
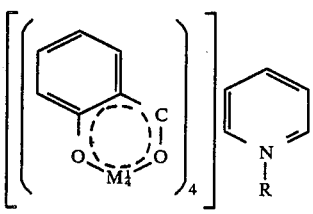
M = Er, Sm, Eu, Gd Tb, Dy, Tm, Yb
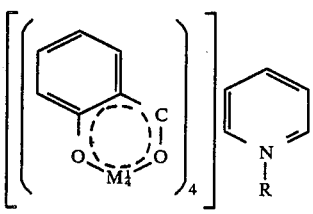
M = Er, Sm, Eu Gd, Tb, Dy Tm, Yb
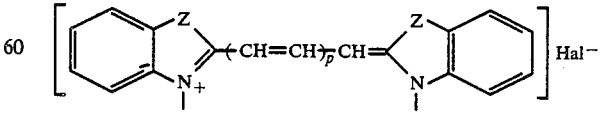
Z = O, S, Se  $0 \leq p \leq 2$
The luminescent compounds as mentioned above can be used either singly or as a mixture. These compounds are merely examples of preferred compounds and other derivatives or other compounds may naturally be useful, provided that the same object can be achieved.

Figure 3:
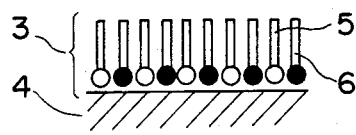
FIG. 3 and FIG. 4 are schematic illustrations of the luminescent layer of the EL device of the present invention.
Figure 4:
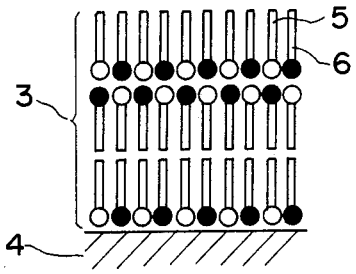

In the embodiment of the present invention as shown in FIG. 3 and FIG. 4, the organic compound to be used as a mixture with the luminescent compound as described above (hereinafter called a co-acting compound) is a compound, which is different in electronegativity from the luminescent compound and can interact electrically with the above luminescent compound when electric energy is applied, and it may be any compound which can donate an electron to the above luminescent compound or can accept an electron from the luminescent compound. For example, the co-acting compound may be selected from the luminescent compounds as mentioned above and other compounds having no luminescent property.

Figure 6:
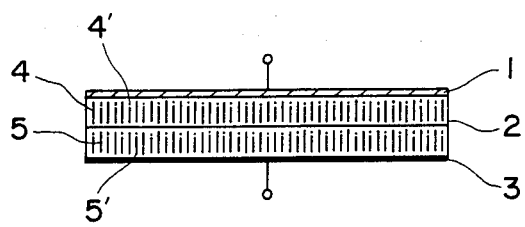
FIGS. 6, 7 and 8 are schematic illustrations of the EL device of the present invention.
Figure 7:
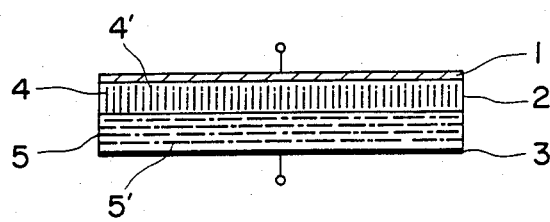
Figure 8:
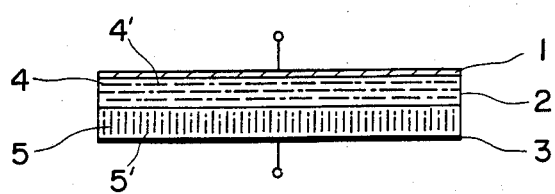

The embodiments of the present invention as shown in FIG. 6, FIG. 7 and FIG. 8 are characterized by employing the luminescent compounds as described above for the first luminescent layer and the second luminescent layer in the EL device of the present invention depending on their electronegativities.

That is, since the luminescent compounds as mentioned above differ from each other in electronegativity, when one or a plurality of the above compounds are employed as the luminescent compound in FIG. 3 and FIG. 4, another luminescent compound different in electronegativity from these luminescent compounds employed or other compounds may be selected as the co-acting compound. On the other hand, in FIG. 6, when one or a plurality of the above compounds are employed as the luminescent compound for formation of the first luminescent layer, another luminescent compound different in electronegativity from these luminescent compounds employed may be selected as the compound for formation of the second luminescent layer. In FIG. 7 and FIG. 8, from among the compounds as mentioned above, a relatively electron-acceptable compound may be employed as the luminescent compound for formation of the first luminescent layer, and a compound relatively electron-donative to those compounds may be selected from the above luminescent compounds as the compound for formation of the second luminescent layer.

Of such co-acting compounds and luminescent compounds, particularly preferable electron-donative compounds are mainly those having an electron-donative group such as a primary to tertiary amino group, a hydroxyl group, an alkoxy group, an alkyl ether group, etc. or nitrogen heterocyclic compounds, while preferable electron-acceptable compounds are mainly those having an electron attracting group such as a carbonyl group, a sulfonyl group, a nitro group, a quaternary amino group, etc.

Such co-acting compounds may be used at a molar ratio of about 0.1 to about 10 to the above luminescent compound, preferably at a molar ratio of 1:1. Such co-acting compounds may also be used in the present invention either singly or as a mixture of plural compounds.

The present invention is characterized by further increasing electron-acceptability of the first layer by further adding to the luminescent compound forming the first layer as described above an organic compound more electron-acceptable than said compound (hereinafter called acceptor), preferably at a proportion of about 1/10–1/100 mol per mol of the former, and further increasing electrondonating ability of the second layer by further adding to the luminescent compound forming the second layer as described above an organic compound more electron-donative than said compound (hereinafter called donor), preferably at a proportion of about 1/10–1/100 mol per mol of the former.

The acceptor as mentioned above may be selected either from the above luminescent compounds or from other organic compounds having a greater electron-attracting ability than those mentioned above. Also, the donor may be selected either from the above luminescent compounds or from other organic compounds having a greater electron-donating ability than those mentioned above. For example, the acceptor may be selected from various compounds carrying a substituent having a greater electron-attracting ability as mentioned above, and the donor from various organic compounds carrying a substituent having a greater electron-donating ability as mentioned above.

Other elements for forming the EL device of the present invention, namely the transparent electrode and the back electrode, have the luminescent layer sandwiched therebetween, and any of those known in the art may be available, but at least one of them is required to be transparent. As the transparent electrode, any of transparent electrodes employed in the prior art may be used, including preferably those of transparent synthetic resins such as polymethyl methacrylate, polyester, etc., transparent film or sheet of glass, etc. coated on its entire surface or in a pattern with a transparent electroconductive material such as indium oxide, tin oxide, indium-tin oxide (ITO), etc. When an opaque back electrode is used on one of the surfaces, the opaque electrode may be any of those known in the art, but it may generally and preferably be a deposited film of aluminum, silver, gold, etc. with a thickness of about 0.1 to 0.3 $\mu$m. The transparent electrode and the back electrode may be in any desired shape, such as plate, belt, cylinder, etc., which can be selected depending on the purpose of use. The thickness of the transparent electrode may preferably be about 0.01 to 0.2 $\mu$m. With a thickness below this range, the physical strength or electrical properties of the device itself will be unsatisfactory, while a thickness over said range may pose problems in transparency, light weight, compactness, etc.

The EL device of the present invention can be obtained by forming a luminescent layer from a mixture of the electroluminescent compound as described above and the co-acting compound as described above between the two electrodes as mentioned above, and its specific feature resides in the molecules constituting the luminescent layer formed, which are arranged in a mixed monomolecular film or its built-up film with a highly ordered molecular orientation (FIG. 3 and FIG. 4).

In FIGS. 1, 2, 3 and 4, 1 shows a hydrophobic moiety, 2 a hydrophilic moiety, 3 a luminescent layer, 4 a substrate, 5 a luminescent compound and 6 a co-acting compound.

The EL device of the present invention can also be obtained by forming a luminescent layer constituted of two layers by using separately the electroluminescent compounds (including acceptor or donor) different relatively in electronegativity as described above between the two electrodes as mentioned above, and its specific feature resides in the molecules constituting the luminescent layer of the double-layer structure formed, which are arranged in a mixed monomolecular film or its built-up film with a highly ordered molecular orientation (FIG. 6).

Figure 5:
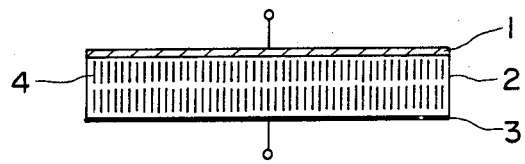
FIG. 5 is a schematic illustrations of the EL device prepared by the LB method of the prior art.

In FIG. 5, 1 shows a transparent electrode, 2 a luminescent layer, 3 a back electrode and 4 a luminescent compound. In FIG. 6, 1 shows a transparent electrode, 2 a luminescent layer, 3 a back electrode, 4 a luminescent compound, 4' an acceptor, 5 a luminescent compound, and 5' a donor.

Further, the EL device of the present invention can also be obtained by forming a luminescent layer constituted of two layers by using separately the electroluminescent compounds(including an acceptor or a donor) different relatively in electronegativity as described above between the two electrodes as mentioned above, and its specific feature resides in that the first layer constituting the luminescent layer of the double-layer structure formed is a mixed monomolecular film or its built-up film facing to the transparent electrode, comprising molecules of compounds more electron-acceptable than the second layer arranged with a highly ordered molecular orientation, and the second layer is a deposited film of mixed molecules facing to the back electrode layer, comprising compounds more electron-donative than the first layer (FIG. 7).

In FIG. 7, 1 shows a transparent electrode, 2 a luminescent layer, 3 a back electrode, 4 a luminescent compound, 4' an acceptor, 5 a luminescent compound, and 5' a donor.

Further, the EL device of the present invention can also be obtained by forming a luminescent layer constituted of two layers by using separately the electroluminescent compounds(including acceptor or donor) different relatively in electronegativity as described above between the electrode pair as mentioned above, and its specific feature resides in that the first layer constituting the luminescent layer of the double-layer structure formed is a deposited film of mixed molecules facing to the transparent electrode, comprising compounds containing acceptor which are more electron-acceptable than the second layer, and the second layer is a mixed monomolecular film or its built-up film faced to the back electrode, comprising compounds containing donor which are more electron-donative than the first layer arranged with a highly ordered molecular orientation (FIG. 8).

Figure 9:
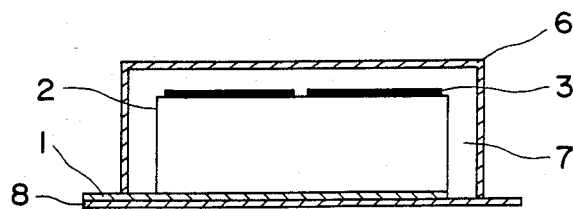
FIG. 9 is a schematic illustration of a cross-section of the EL device of the present invention.

In FIG. 8 and FIG. 9, 1 shows a transparent electrode, 2 a luminescent layer, 3 a back electrode, 4 a luminescent compound, 4' an acceptor, 5 a luminescent compound, 5' a donor and 6 a seal glass, 7 a silicone insulating oil and 8 a glass plate.

In the present invention, as the particularly preferred method for forming such monomolecular films or built-up films thereof, there may be employed the Langmuir-Blodgett's method (LB method). The LB method is a method for preparing a monomolecular film or a built-up film of monomolecules by utilizing the fact that, for example, in molecules with a structure having a hydrophilic group and a hydrophobic group in the molecule, when the balance between the both groups (amphiphilic balance) is adequately maintained, the molecule will form a layer of monomolecule with the hydrophilic group directing downward on the water surface. More specifically, the spreading area is restricted by providing a partitioning plate (or buoy) so that the monomolecular films spread on the aqueous layer may not be diffused freely to be expanded excessively, thereby controlling the gathered state of the film material to increase gradually the surface pressure and set a surface pressure which is suitable for prepartion of a monomolecular film or its built-up film. While maintaining this surface pressure, a clean substrate can be moved vertically, whereby the monomolecular film can be transferred onto the substrate. The monomolecular film can be prepared according to the above operation, and the built-up film of monomolecular layers can be formed to have a desired number of layers by repeating the above operation.

For transfer of the monomolecular film onto the substrate, in addition to the above vertical dipping method, the horizontal lifting method, the rotatory cylindrical method, etc. may also be applicable. The horizontal lifting method is the method of transferring the film by permitting the substrate to contact the water surface horizontally, and the rotatory cylindrical method is the method of rotating a cylindrical substrate on the water surface to have the monomolecular film transferred onto the substrate surface. In the vertical dipping method as described above, when a substrate with a hydrophilic surface is withdrawn in the direction transversing the water surface, a monomolecular film with hydrophilic groups of molecules facing toward the substrate side is formed on the substrate. By moving vertically the substrate as described above, monomolecular films will be laminated one by one in respective steps. Since the orienting directions of the film-forming molecules are opposite in the withdrawing step and the dipping step, the so-called Y type film is formed according to this method, in which the hydrophilic groups of molecules are faced to the hydrophilic groups between respective layers and hydrophobic groups of molecules to the hydrophobic groups. In contrast, according to the horizontal lifting method, the monomolecular film is transferred by attaching the substrate horizontally to the water surface, whereby a monomolecular film with the hydrophobic groups faced toward the substrate side will be formed on the substrate. In this method, no alteration in direction occurs in the film-forming molecules by built-up of films, but X type film will be formed, wherein the hydrophobic groups are faced toward the substrate side in all the layers. On the contrary, a built-up film in which the hydrophilic groups are faced toward the substrate side is called Z type film. The rotatory cylinder method is a method in which the monomolecular film is transferred onto the substrate surface by rotating a cylindrical substrate on the water surface. The method for transferring the monomolecular film is not restricted to these methods. For example, when using a large area substrate, it is possible to employ the method in which a substrate is extruded into an aqueous layer from a substrate roll.

The orienting direction of hydrophilic groups and hydrophobic groups referred to above is a general rule, and the direction can be changed by surface treatment of the substrate, etc.

In the present invention, as the method for forming a mixed deposited film constituting the luminescent layer, there may preferably be employed the resistance heating vapor deposition method or the CVD method. For example, according to the vapor deposition method, a thin film of about 500 Å can be formed as the luminescent layer.

For example, in the case of the resistance heating vapor deposition method, a material is put on a tungsten boat placed in a vacuum chamber and resistance heating of the material is effected at a distance of 30 cm apart from the substrate at a temperature set at a sublimation temperature or higher in the case of a sublimable material or at a melting temperature or higher in the case of a meltable material. The pre-vacuum degree is set at $2 \times 10^{-6}$ Torr or less and the chamber is shut with a shutter before vapor deposition for heating the boat to effect blank flushing for about 2 minutes, followed by vapor deposition with opening of the shutter.

The speed of vapor deposition is monitored by a film thickness monitor of a quartz oscillator, and it is preferred to be between 0.1 Å/sec and 100 Å/sec. The vacuum degree during the vapor deposition should preferably be maintained at $10^{-3}$ Torr or less, preferably $10^{-5}$ Torr or less, in order to prevent oxidation, etc.

The EL device of the present invention can be obtained by forming the material for formation of luminescent layer as described above preferably according to the LB method as described above between the two layers of electrode layers as described above (FIG. 3, FIG. 4).

The EL device of the present invention may include the acceptor or the donor as described above and can be obtained by forming a luminescent layer of a double-layer structure between the a pair of electrodes as described above by use of materials for formation of luminescent layer with different electronegativities preferably according to the LB method is described above (FIG. 6).

Also, the EL device of the present invention can be obtained by forming the first layer faced to the transparent electrode as mentioned above by formulating a mixture of a relatively electron-acceptable compound and an appropriate acceptor selected from among the compounds is mentioned above and forming a mixed monomolecular film thereof or its built-up film according to, for example, the LB method, and, forming as the second layer faced to the back electrode by formulating a mixture of a relatively electron-donative compound and an appropriate donor selected from among the compounds as mentioned above and forming a deposited film of mixed molecules according to the method as described above, thereby forming a double-layer structure of the luminescent layer (FIG. 7).

Further, the EL device of the present invention can be obtained by forming the first layer faced to the transparent electrode as mentioned above by formulating a mixture of a relatively electron-acceptable compound and an appropriate acceptor selected from among the compounds as mentioned above and forming a deposited film of mixed molecules according to the molecular deposition method as described above, and, forming as the second layer faced to the back electrode by formulating a mixture of a relatively electron-donative compound and an appropriate donor selected from among the compounds as mentioned above and forming a mixed monomolecular film or its built-up film according to, for example, the LB method, thereby forming a double-layer structure of the luminescent layer (FIG. 8).

As described in the introductory part of the prior art, formation of the EL device according to the LB method has been known in the art. However, according to the method of the prior art, no EL device of satisfactory performance could be obtained. As the result of extensive studies by the present inventors, the performance of the EL device of the prior art was found to be markedly improved by forming a luminescent layer as shown below.

(1) As the material for forming the luminescent layer, not a single material, but a composite material with different electronegativities, of which at least one is luminescent, is used to form similarly a monomolecular film or its built-up film with ease.

(2) By making the luminescent layer a double-layer structure, the respective luminecent layers are formed as a mixed monomolecular film or its built-up film by use of the compounds with different electronegativities containing the acceptor or the donor as described above.

(3) By making the luminescent layer a double-layer structure, the first luminescent layer is formed as a mixed monomolecular film or its built-up film by use of compounds containing the acceptor as described above which are relatively electron-acceptable, and the second layer is formed as a deposited film of mixed molecules of compounds containing a donor which are electron-donative relative to the first layer.

(4) By making the luminescent layer a double-layer structure, the first luminescent layer is formed as a deposited film of mixed molecules by use of compounds containing the acceptor as described above which are relatively electron-acceptable, and the second layer is formed as a mixed monomolecular film or its built-up film by use of compounds containing a donor which are relatively electron-donative relative to the first layer.

In the following, important embodiments of the present invention are to be described. The first embodiment of the present invention is an embodiment in which the luminescent layer comprises a composite material as described above. The EL device according to this embodiment can be prepared by dissolving necessary materials at necessary proportions in an appropriate organic solvent, for example, chloroform, dichloromethane, dichloroethane, etc., at concentrations of about $10^{-4}$ to $10^{-2}$ M, spreading the resultant solution over an aqueous phase of an appropriate pH (e.g. about pH 1–8) which may contain various kinds of metal ions, evaporating the solvent to form a mixed monomolecular film, transferring it onto one of the electrode substrates according to the LB method as described above, then vapor depositing an electrode material such as aluminum, silver, gold, etc. on the monomolecular layer, preferably according to vapor deposition, etc., to form a back electrode. The luminescent layer of the EL device thus prepared, which may differ depending on the materials employed, may generally be preferred to be about 0.01 to 1 μm.

According to the second embodiment, the luminescent layer of the EL device of the present invention is the built-up film of the above mixed monomolecular films. Said embodiment can be obtained by use of the above LB method by building up the mixed monolecular film as described to a desired number of layers according to various methods. The thickness of the EL device thus obtained, namely the built-up number of mixed monomolecular films can be varied as desired, but it is preferred in the present invention to be about 4 to 400.

The third embodiment of the present invention is an embodiment in which each layer constituting the luminescent layer is a mixed monomolecular film comprising the above-mentioned luminescent material containing an acceptor or a donor. The EL device according to this embodiment can be prepared by first dissolving a material containing an acceptor which is electron-acceptable relative to other layers in an appropriate organic solvent such as chloroform, dichloromethane, dichloroethane, etc. at a concentration of about $10^{-4}$ to $10^{-2}$ M, spreading the resultant solution over an aqueous phase at an appropriate pH (e.g. pH about 1-8) which may contain various metal ions, thereby evaporating the solvent to form a mixed monomolecular film, and transferring the film to one of the electrode substrates according to the LB method as described above to form a first layer, followed by sufficient drying, and subsequently transferring a material containing a donor which is electron-donative relative to the thus formed first layer similarly onto the thus formed first luminescent layer, and then depositing on the surface of the second layer an electrode material such as aluminum, silver, gold, etc. preferably by vapor deposition etc. to form a back electrode. The order of forming the first layer and the second layer may also be reversed to obtain the same effect.

The thickness of the luminescent layer comprising two layers of a mixed monomolecular film of the EL device thus obtained, which may differ depending on the materials employed, may generally be preferred to be 0.01 to 1 μm.

According to the fourth embodiment, at least one, preferably both of the two layers constituting the luminescent layer of the EL device of the present invention are built-up films of the above mixed monomolecular film. Said embodiment can be obtained by use of the LB method as described above by building up the mixed monomolecular film as described above to a desired number of layers according to various methods.

The thickness of the luminescent layer of the EL device thus obtained, namely the built-up number of mixed monomolecular films can be varied as desired, but it should preferably be about 4 to 400 in total for the two layers.

The fifth embodiment of the present invention is an embodiment in which the first luminescent layer is a mixed monomolecular layer comprising the above luminescent material. The EL device according to this embodiment can be prepared by first dissolving a material containing an acceptor which is electron-acceptable relative to other layers in an appropriate organic solvent such as chloroform, dichloromethane, dichloroethane, etc. at a concentration of about $10^{-4}$ to $10^{-2}$ M, spreading the resultant solution over an aqueous phase at an appropriate pH (e.g. pH about 1-8) which may contain various metal ions, thereby evaporating the solvent to form a mixed monomolecular film, and transferring the film to one of the electrode substrate according to the LB method as described above to form a first layer, followed by sufficient drying, and subsequently forming a mixture of a material containing a donor which is electron-donative relative to the thus formed first layer and a donor into a second layer as the deposited film of mixed molecules according to the molecular deposition method as described above, and then depositing on the surface of the second layer an electrode material such as aluminum, silver, gold, etc. preferably by vapor deposition etc. to form a back electrode layer.

The thickness of the luminescent layer comprising two layers of a mixed monomolecular film of the EL device thus obtained, which may differ depending on the materials employed, may generally be preferred to be 0.01 to 1 μm.

The sixth embodiment of the present invention is an embodiment in which the first layer constituting the luminecent layer of the EL device of the present invention is a built-up film of the above mixed monomolecular film. Said embodiment can be prepared by use of the above LB method by building up the mixed monomolecular film as described above to a desired number according to various methods, and then forming the second layer as described above.

The thickness of the luminescent layer of the EL device of the present invention thus obtained can be varied as desired, but it is preferred in the present invention that the built-up number of the mixed monomolecular films in the first layer should be about 4 to 200, the thickness of the second layer about 0.01 to 0.5 μm and the entire thickness of the luminescent layer about 0.02 to 1 μm.

The seventh embodiment of the present invention is an embodiment in which the first luminescent layer is the mixed molecular deposition film as described above and the second luminescent layer is a mixed monomolecular film comprising the above luminescent material containing a donor. The EL device according to this embodiment can be prepared by first forming the first layer, then dissolving a material which is electron-donative relative to first layer and an acceptor in an appropriate organic solvent such as chloroform, dichloromethane, dichloroethane, etc. at a concentration of about $10^{-4}$ to $10^{-2}$ M, spreading the resultant solution over an aqueous phase at an appropriate pH (e.g. pH about 1-8) which may contain various metal ions, thereby evaporating the solvent to form a mixed monomolecular film, and transferring the film to one of the electrode substrate according to the LB method as described above to form a second layer, followed by sufficient drying, and subsequently depositing on the surface of the second layer an electrode material such as aluminum, silver, gold, etc. preferably by vapor deposition etc. to form a back electrode.

The thickness of the luminescent layer comprising two layers of a mixed monomolecular film of the EL device thus obtained, which may differ depending on the materials employed, may generally be preferred to be 0.01 to 1 μm.

The eighth embodiment of the present invention is an embodiment in which the second layer constituting the luminescent layer of the EL device of the present invention is a built-up film of the above mixed monomolecular film. Said embodiment can be prepared by use of the above LB method by building up the mixed monomolecular film as described above to a desired number according to various methods, on the transparent substrate on which the deposited film of mixed molecules has already been formed.

The thickness of the luminescent layer of the EL device of the present invention thus obtained can be varied as desired, but it is preferred in the present invention that the thickness of the deposited film of mixed molecules in the first layer should be about 0.01 to 0.5 μm, the built-up number of the mixed monomolecular film about 4 to 200, and the entire thickness of the luminescent layer about 0.02 to 1 μm.

Adhesion between one electrode or both electrodes used as the substrate and the luminescent layer is sufficiently firm in the LB method and the molecular deposition method, and therefore the luminescent layer will never exfoliate or peel off from the substrate, but it is also possible for reinforcement of adhesive force to treat previously the substrate surface or provide an appropriate adhesive layer between the substrate and the luminiscent layer. Further, in the LB method, the adhesive force can also be reinforced by selecting various kinds of materials for formation of the luminescent layer or controlling various kinds of conditions such as pH of the aqueous phase employed, ion species, water temperature, transition temperature of the monomolecular film or surface pressure of the monomolecular film, etc.

The EL device in the form as prepared above may sometimes be deteriorated in its performance by the effect of humidity or oxygen in the air, and therefore it is desired to be formed into a sealed structure resistant to humidity and oxygen according to a means known in the art.

The EL device of the present invention as described above has a ultra-thin film structure of the luminescent layer and also has the following characteristics:

(1) It has high degree of molecular orderliness and function required in actuation of EL device and has excellent luminescent performance. Also, in aspect of manufacture, it can be made an EL device uniform in thickness of the luminescent layer and without defect over a large area, and can be prepared under the conditions of normal temperature and normal pressure or approximate thereto. Therefore, there is also the advantage that a luminescent functional material having relatively poorer heat resistance can also be used (FIG. 3, FIG. 4).

(2) It has high degree of molecular orderliness and function required in actuation of EL device and has excellent luminescent performance. Also, in aspect of manufacture, it can be made an EL device uniform in thickness of the luminescent layer and without defect over a large area, and can be prepared under the conditions of normal temperature and normal pressure or approximate thereto. Therefore, there is also the advantage that a luminescent functional material having relatively poorer heat resistance can also be used (FIG. 6).

(3) The first layer has high degree of molecular orderliness and function required in actuation of EL device and has excellent luminescent performance, and the second layer and the first layer through various mutual electrical actions can exhibit excellent luminescent performance (FIG. 7).

(4) The second layer has high degree of molecular orderliness and function required in actuation of EL device and has excellent luminescent performance, and the first layer and the second layer through various mutual electrical actions can exhibit excellent luminescent performance (FIG. 8).

Figure 2:
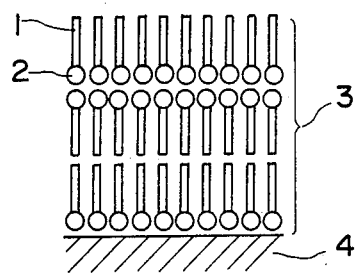

Further, the luminescent layer of the present invention as shown in FIG. 3 and FIG. 4, as different from the luminescent layer comprising a single substance schematically shown in FIG. 1 and FIG. 2, comprises a primary luminescent material and a coacting material mixed homogeneously in the monomolecular film as schematically illustrated in FIG. 3 and FIG. 4, and therefore various interactions between those different molecules can very easily occur, whereby excellent luminescent performance to the extent not attainable by the prior art can be exhibited. Thus, by varying the difference in electronegativity between the primary luminescent material and the co-acting material or their combinations, the luminescent intensity can be improved or luminescent color can freely be changed, and also the life of the layer can markedly be prolonged.

Further, in the luminescent layer of the present invention as shown in FIG. 6, as different from the luminescent layer comprising a single layer schematically shown in FIG. 5, since the first luminescent layer and the second luminescent layer have a uniform interface therebetween as illustrated schematically in FIG. 6, various interactions between the two layers can very easily occur, whereby excellent luminescent performance to the extent not attainable by the prior art can be exhibited. That is, by varying the difference in electronegativity between the primary luminescent material and the co-acting material or combinations thereof, the luminescent intensity can be improved or luminescent color can freely be changed, and also the life of the layer can markedly be prolonged.

Further, in the luminescent layer of the present invention as shown in FIG. 7, as different from the luminescent layer comprising a single layer shown schematically in FIG. 5, since the first luminescent layer and the second luminescent layer have a uniform interface therebetween as illustrated schematically in FIG. 7, various interactions between the two layers can very easily occur, whereby excellent luminescent performance to the extent not attainable by the prior art can be exhibited. That is, by varying the difference in electronegativity between the primary luminescent material and the co-acting material or combinations thereof, the luminescent intensity can be improved or luminescent color can freely be changed, and also its life of the layer can markedly be prolonged.

Further, in the luminescent layer of the present invention as shown in FIG. 8, being different from the luminescent layer comprising a single layer schematically shown in FIG. 5, since the first luminescent layer and the second luminescent layer have a uniform interface therebetween as illustrated schematically in FIG. 8, various interactions between the two layers can very easily occur, whereby excellent luminescent performance to the extent not attainable by the prior art can be exhibited. That is, by varying the difference in electronegativity between the primary luminescent material and the co-acting material or combinations of them, the luminescent intensity can be improved or luminescent color can freely be changed, and also the life of the layer can markedly be prolonged.

Further, in the prior art, materials which are excellent in luminescent characteristic but insufficient in film-forming property or film strength could not substantially be employed. However, in the present invention, even such materials inferior in film-forming property or film strength but excellent in luminescent characteristic can be used by combining with a material excellent in film-forming property as the aforesaid co-acting material or by using a material in either the first layer or the second layer to give a luminescent layer which is excellent in all of luminescent characteristic, film-forming property and film strength.

The EL device of the present invention as described above can give excellent EL luminance by application of an electric energy such as an alternate current, pulse or direct current, etc. between the electrodes so that suitable electric energy such as electrical field may act on its luminescent layer.

The present invention is described in more detail by referring to the following Examples, in which parts indicate parts by weight.

EXAMPLE 1

On the surface of a 50 mm glass plate, an ITO layer with a layer thickness of 1500 Å was vapor deposited according to the sputtering method to form a transparent electrode. After the transparent electrode was thoroughly washed, it was dipped as the film-forming substrate in an aqueous phase containing $4 \times 10^{-4}$ M $CdCl_2$ and adjusted to pH 6.5 in Langmuir- Trough 4 produced by Joyce-Loebel Co.

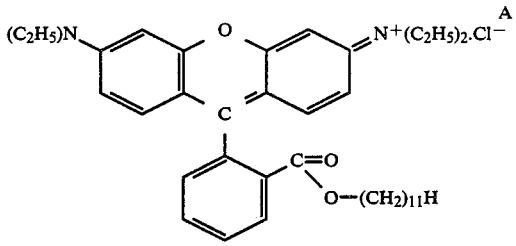

A

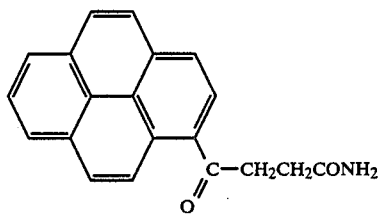

B

Subsequently, after the above compounds A and B were dissolved at a molar ratio of 1:1 in chloroform ($10^{-3}$ mol/liter), the resultant solution was spread over the above aqueous phase. After the solvent chloroform was evaporated, the surface pressure was enhanced (30 dyne/cm) to have the above mixed molecules precipitated out in a film. Then, while maintaining constantly the surface pressure, the above film-forming substrate was moved upwardly or receiprocatively in the direction transversing the water surface (moving speed: 2 cm/min.), thereby transferring the mixed monomolecular film onto the substrate to prepare a monomolecular film of one layer and built-up monomolecular films having built up 10, 15, 20, 25 and 30 layers, respectively. In the course of building up layers, every time when said substrate was withdrawn from the water vessel, it was left to stand for 30 minutes or longer to evaporate the water attached on the substrate.

Each of the substrates having 6 kinds of thin films formed as described above was placed in a vapor deposition chamber. After said chamber was evacuated to a vacuum of $10^{-6}$ Torr, it was adjusted to a vacuum degree of $10^{-5}$ Torr, and aluminum was deposited in a pattern at a deposition speed of 20 Å/sec, to a film thickness of 1500 Å on each thin film to form a back electrode. The six EL devices of the present invention as prepared above were sealed with seal glass as shown in FIG. 9, and then silicone oil purified, degassed and dehydrated in conventional manner was injected into the seal to form six sealed EL luminescent cells. When an alternate current of 10 V and 400 Hz was applied on each of these EL luminescent cells, six EL luminescences having colors inherent in said dyes could be obtained. The evaluation results are shown in Table 1.

Such EL devices of the present invention were found to be lower in driving voltage and better in luminance characteristic as compared with EL devices of the prior art using ZnS as the luminescent matrix.

EXAMPLE 2

Following the same procedure as in Example 1 except for using the following compounds,

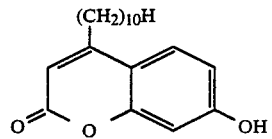

C

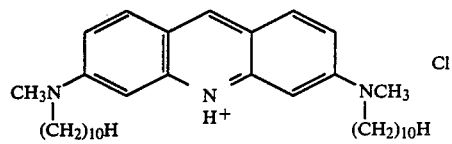

D six EL devices of the present invention, having a mixed homomonomolecular film and its built-up film (10, 15, 20, 25 and 30 layers) as the luminescent layer, were prepared.

Such EL devices of the present invention were found to be lower in driving voltage and better in luminance characteristic as compared with EL devices of the prior art using ZnS as the luminescent matrix. The evaluation results are shown in Table 1.

COMPARATATIVE EXAMPLE 1

Except for using only the compound shown below as the luminescent compound:

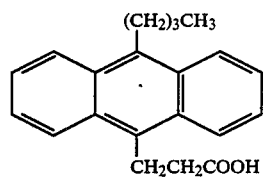

Example 1 was repeated to obtain an EL device for comparative purpose, which was evaluated similarly as in Example 1. The evaluation results are shown in Table 1.

TABLE 1

| | | Luminance (Ft-L) | Current density (mA/cm²) (3 V, 400 Hz) |
|---|---|---|---|
| Example 1 | 1 | 2 | 0.6 |
| Numbers of | 10 | 10 | 0.1 |
| built-up | 15 | 12 | 0.1 |
| layers | 20 | 20 | 0.09 |
| | 25 | 20 | 0.09 |
| | 30 | 16 | 0.07 |
| Example 2 | 1 | 2 | 0.5 |
| Numbers of | 10 | 11 | 0.09 |
| built up | 15 | 15 | 0.09 |
| layers | 20 | 22 | 0.08 |
| | 25 | 25 | 0.07 |
| | 30 | 24 | 0.07 |
| Comparative | 1 | 1 or less | 0.2 |
| example 1 | 10 | " | 0.1 |
| Numbers of | 15 | " | 0.08 |
| built up | 20 | " | 0.08 |
| layers | 25 | " | 0.08 |
| | 30 | " | 0.07 |

EXAMPLE 3

In place of the compounds A and B, the following compounds were employed at a molar ratio of 1:4:

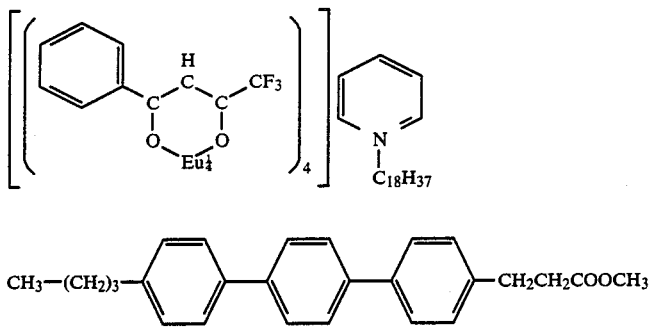

following otherwise the same procedure as in Example 1, to obtain an EL device of the invention (having 15 built-up films). When this device was evaluated under the same conditions as in Example 1, it was found to exhibit a luminance (Ft-L) of 28 at a current density of 0.08 mA/cm$^2$.

EXAMPLE 4

On the surface of a 50 mm square glass plate, an ITO layer with a layer thickness of 1500 Å was vapor deposited according to the sputtering method to form a transparent electrode. After the transparent electrode was thoroughly washed, it was dipped as the film-forming substrate in an aqueous phase containing $4 \times 10^{-4}$ M CdCl$_2$ and adjusted to pH 6.5 in Langmuir-Trough 4 produced by Joyce-Loebel Co.

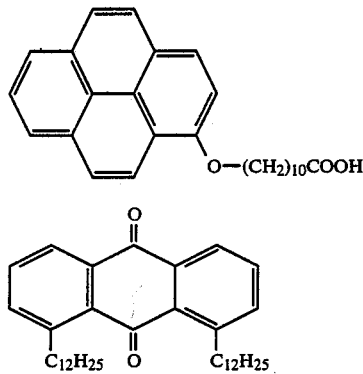

Subsequently, after the above compounds A and B were dissolved at a molar ratio of 100:1 in chloroform ($10^{-3}$ mol/liter), the resultant solution was spread over the above aqueous phase. After the solvent chloroform was evaporated, the surface pressure was raised (30 dyne/cm) to have the above mixed molecules precipitated out in a film. Then, while maintaining the surface pressure at the constant value, the above film-forming substrate was moved upwardly or reciprocatively in the direction transversing the water surface (moving speed: 2 cm/min.), thereby transferring the mixed monomolecular film onto the substrate to prepare a monomolecular film of one layer and built-up monomolecular films having built-up 3, 5, 9, and 15 layers, respectively. In the course of building up layers, every time when said substrate was withdrawn from the water vessel, it was left to stand for 30 minutes or longer to evaporate the water attached on the substrate.

Next, the above monomolecular film remaining on the surface of said aqueous phase was removed completely, and the following compounds:

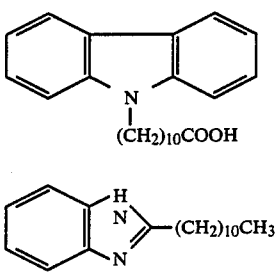

were newly dissolved at a mixing ratio of 10:1 in chloroform ($10^{-3}$ mol/liter) and the resultant solution was spread on the above aqueous phase. According to the same method as described above, there were formed the new functional mixed film and built-up films having 3, 5, 9 and 15 mixed monomolecular films built up on the surface of the mixed monomolecular film or the built-up films already formed.

Each of the substrates having the thin films formed as described above was placed in a vapor deposition chamber. After said chamber was evacuated to a vacuum of $10^{-6}$ Torr, it was adjusted to a vacuum $10^{-5}$ Torr, and aluminum was deposited at a deposition speed of 20 Å/sec, to a film thickness of 1500 Å on each thin film to form a back electrode. The EL devices of the present invention as prepared above were sealed with seal glass as shown in FIG. 9, and then silicone oil purified, degassed and dehydrated in conventional manner was injected into the seal to form five sealed EL luminescent cells. When an alternate current was applied on each of these EL luminescent cells, EL luminescences having colors inherent in said dyes could be obtained. The evaluation results are shown in Table 2.

Such EL devices of the present invention were found to be lower in driving voltage and better in luminance characteristic as compared with EL devices of the prior art using ZnS as the luminescent matrix.

COMPARATIVE EXAMPLE 2

Except for using only the compound A as the luminescent compound and making the luminescent layer a single layer, Example 4 was repeated to obtain an EL device for comparative purpose, which was evaluated similarly as in Example 4. The evaluation results are shown in Table 2.

TABLE 2

| | Driving voltage | Luminance (Ft-L) | Current density (mA/cm$^2$) |
|---|---|---|---|
| Example 4 Numbers of built-up layers | | | |
| First layer / Second layer | | | |
| 1  1 | 3 V, 400 Hz | 3.0 | 0.16 |
| 3  3 | 10 V, 400 Hz | 20 | 0.14 |
| 5  5 | 10 V, 400 Hz | 28 | 0.13 |
| 9  9 | 10 V, 400 Hz | 32 | 0.11 |
| 15  15 | 10 V, 400 Hz | 33 | 0.10 |
| Comparative example 2 Numbers of built-up layers | | | |
| 2 | 3 V, 400 Hz | 1 or less | |
| 6 | 10 V, 400 Hz | 5 or less | |
| 10 | 10 V, 400 Hz | " | |
| 18 | 10 V, 400 Hz | " | |
| 30 | 10 V, 400 Hz | " | |

EXAMPLE 5

In place of the compounds A and B in Example 4, the following compounds E and F were employed

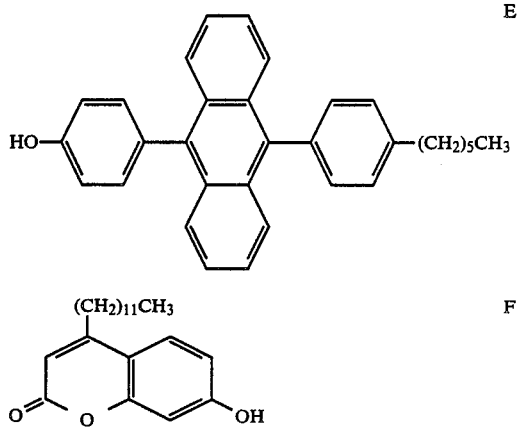

following otherwise the same procedure as in Example 4, to obtain an EL device of the invention (having 15 built-up layers). When this device was evaluated under the same conditions as in Example 1, it was found to have a luminance (Ft-L) of 35 at a current density of 0.09 mA/cm$^2$.

EXAMPLE 6

On the surface of a 50 mm square glass plate, an ITO layer with a layer thickness of 1500 Å was vapor deposited according to the sputtering method to form a transparent electrode. After the transparent electrode was thoroughly washed, it was dipped as the film-forming substrate in an aqueous phase containing $4 \times 10^{-4}$ M CdCl$_2$ and adjusted to pH 6.5 in Langmuir-Trough 4 produced by Joyce-Loevel Co.

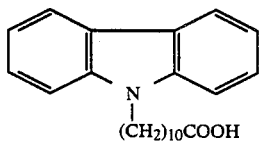

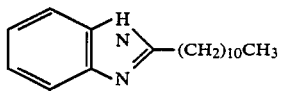

Subsequently, after the above compounds A and B were dissolved at a molar ratio of 10:1 in chloroform ($10^{-3}$ mol/liter), the resultant solution was spread over the above aqueous phase. After the solvent chloroform was evaporated, the surface pressure was raised (30 dyne/cm) to have the above mixed molecules precipitated out in a film. Then, while maintaining the surface pressure at the constant value, the above film-forming substrate was moved upwardly and downwardly in the direction transversing the water surface (moving speed: 2 cm/min.), thereby transferring the mixed monomolecular film onto the substrate to prepare a monomolecular film of one layer and built-up monomolecular films having built up 3, 5, 9, and 15 layers, respectively. In the course of building up layers, every time when said substrate was withdrawn from the water tank, it was left to stand for 30 minutes or longer to evaporate the water attached on the substrate.

Next, by means of a resistance heating vapor deposition device, on the transparent electrode substrate having the above built-up film of mixed monomolecular films thereon, anthracene (B) (m.p. 216° C.) and anthraquinone (D) (m.p. 286° C.) were vapor deposited to a layer thickness of 500 Å. The vapor deposition was carried out by reducing once the vapor deposition chamber to a vacuum of $10^{-6}$ Torr, elevating gradually the temperature of the resistance-heating board (Mo) and maintaining the current flowing through the resistance-heating boat constantly so that the vapor deposition speed of anthraquinone might be about 1 Å/sec, and also controlling the current flowing through the boat in which anthracene is placed so that the total vapor deposition speed might be 5 Å/sec. The vacuum during vapor deposition was $9 \times 10^{-6}$ Torr. The temperature of the substrate holder was maintained constant by circulation of water of 20° C.

Finally, the thin films as formed above were placed in a vapor deposition chamber, which was evacuated to vacuum of $10^{-6}$ Torr, followed by adjustment of vacuum to $10^{-5}$ Torr, and aluminum was formed under this condition at a vapor deposition speed of 20 Å/sec to a thickness of 1500 Å on said thin films to form a back electrode. The EL device prepared was sealed with seal glass as shown in FIG. 3, and then silicone oil purified, degassed and dehydrated in conventional manner was injected into the seal to form a sealed EL luminescent cell. When an alternate current of 10 V, 400 Hz was applied on the EL luminescent cell, it was found to exhibit EL luminescence of a luminance of 24 Ft-L at a current density of 0.10 mA/cm$^2$.

The above EL device of the present invention was found to be lower in driving voltage and better in luminance characteristic as compared with the EL devices of the prior art using ZnS as the luminescent matrix.

COMPARATIVE EXAMPLE 3

Example 6 was repeated except for forming no second layer to obtain an EL device for comparative purpose, which was evaluated similarly as in Example 6. As the result, it was found to exhibit a luminance of 1 Ft-L or lower at a current density of 0.1 mA/cm².

EXAMPLE 7

In place of the compounds A, B, C and D in Example 6,

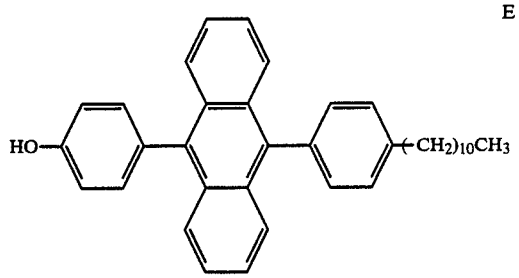

E

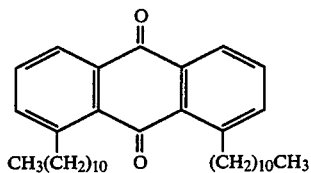

F

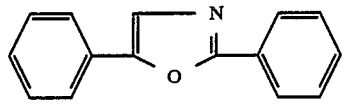

G

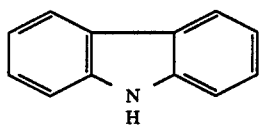

H

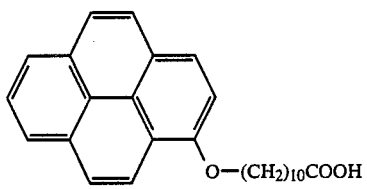

C

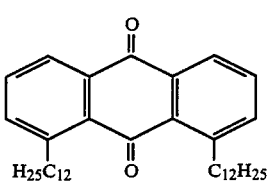

D the above compounds E, F, G and H were employed, following otherwise the same procedure as in Example 6, to obtain an EL device (having 5 built-up films). The device was evaluated under the same conditions as in Example 6 to obtain the result of a luminance (Ft-L) of 30 at a current density of 0.12 mA/cm².

EXAMPLE 8

A transparent electrode was formed by vapor deposition of an ITO layer to a thickness of 1500 Å according to the sputtering method on a glass plate of 50 mm square.

Next, by means of a resistance heating vapor deposition device, on the transparent electrode substrate having the above built-up film of mixed monomolecular films thereon, carbazole (A) (m.p. 245° C.) and indazole (B) (m.p. 146° C.) were vapor deposited to a layer thickness of 500 Å. The vapor deposition was carried out by reducing once the vapor deposition chamber to a vacuum of 10⁻⁶ Torr, elevating gradually the temperature of the resistance-heating board (Mo) and maintaining the current flowing through the resistance-heating boat constantly so that the vapor deposition speed of indazole might be about 1 Å/sec., and also controlling the current flowing through the board in which carbazole was placed so that the total vapor deposition speed might be 5 Å/sec. The vacuum during vapor deposition was $9 \times 10^{-6}$ Torr. The temperature of the substrate holder was maintained constant by circulation of water of 20° C.

Subsequently, after the above compounds C and D were dissolved at a molar ratio of 100:1 in chloroform ($10^{-3}$ mol/liter), the resultant solution was spread over an aqueous phase in Langmuir-Trough 4 produced by Joyce-Loebel Co. containing $4 \times 10^{-4}$ CdCl₂ and adjusted to pH 6.5.

After the solvent chloroform was evaporated, the surface pressure was raised (30 dyne/cm) to have the above mixed molecules precipitated out in a film. Then, while maintaining the surface pressure at the constant value, the above film-forming substrate was slowly moved upwardly or downwardly in the direction transversing the water surface (moving speed: 2 cm/min.), thereby transferring the mixed monomolecular film onto the substrate to prepare a built-up monomolecular film having built up 7 layers. In the course of building up layers, every time when said substrate was withdrawn from the water vessel, it was left to stand for 30 minutes or longer to evaporate the water attached on the substrate.

Finally, the substrate having the thin film as formed above was placed in a vapor deposition chamber, which was evacuated to vacuum of $10^{-6}$ Torr, followed by adjustment of vacuum to $10^{-5}$ Torr, and aluminum was formed under this condition at a vapor deposition speed of 20 Å/sec to a thickness of 1500 Å on said thin films to form a back electrode. The EL device prepared was sealed with seal glass as shown in FIG. 9, and then silicone oil purified, degassed and dehydrated in conventional manner was injected into the seal to form a sealed EL luminescent cell. When an alternate current of 10 V, 400 Hz was applied on the EL luminescent cell, it was found to exhibit EL luminescence of a luminance of 24 Ft-L at a current density of 0.11 mA/cm².

The above EL device of the present invention was found to be lower in driving voltage and better in luminance characteristic as compared with the EL devices of the prior art using ZnS as the luminescent matrix.

COMPARATIVE EXAMPLE 4

Example 8 was prepared except for forming no first layer to obtain an EL device for comparative purpose, which was evaluated similarly as in Example 6. As the result, it was found to exhibit a luminance of 5 Ft-L or lower at a current density of 0.12 mA/cm².

EXAMPLE 9

In place of the compounds A, B, C and D in Example 8,

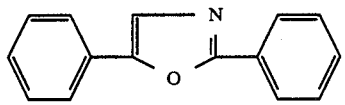
E

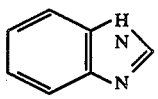
F

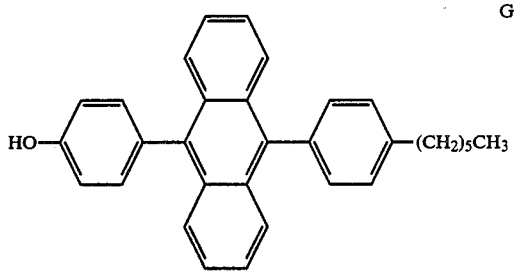
G

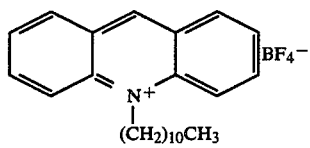
H the above compounds E, F, G and H were employed, following otherwise the same procedure as in Example 6, to obtain an EL device (having 7 built-up films). The device was evaluated under the same conditions as in Example 8 to obtain the result of a luminance (Ft-L) of 29 at a current density of 0.13 mA/cm².

We claim:

1. An electroluminescent device comprising a luminescent layer and a pair of electrodes, wherein said luminescent layer comprises a mixed Langmuir-Blodgett monomolecular film, or built-up film thereof, comprising at least one electroluminescent organic compound and at least one organic compound, said organic compound having an electronegativity different from said electroluminescent organic compound.

2. An electroluminescent device according to claim 1, wherein at least one of the electrodes is transparent.

3. An electroluminescent device according to claim 1, wherein said electroluminescent organic compound is represented by the formula:

$$[(X-R_1)_m Z]_n - \phi - R_2$$

wherein X and R$_2$ each represent hydrogen, halogen, an alkoxy group, an alkyl ether group, a nitro group; a carboxyl group, a sulfonic acid group, a phosphoric acid group, a silicic acid group, a primary to tertiary amino group, and a metal salt thereof, a primary to tertiary amine salt thereof or an acid salt thereof; an ester group, a sulfamide group, an amide group, an imino group, a quaternary amino group and a salt thereof, a hydroxyl group; R$_1$ represents a C$_4$–C$_{30}$ alkyl group; m is 1 or 2; n is an integer of 1 to 4; Z is direct bonding or —O—, —S—, NR$_3$—, —CH$_2$NR$_3$—, —SO$_2$NR$_3$—, —CO—, —COO— (R$_3$ is hydrogen, an alkyl group or an aryl group); and $\phi$ is a fused polycyclic aromatic hydrocarbon, p-terphenyl, 2,5-diphenyloxazole, 1,4-bis(2-methylstyryl)-benzene, xanthine, coumarine, acridine, cyanine dye, benzophenone, phthalocyanine and a metal complex thereof, porphyrin and a metal complex thereof, 8-hydroxyquinoline and a metal complex thereof, an organic ruthenium complex, an organic rare earth complex, and a derivative of these compounds, a heterocyclic compound and a derivative thereof, an aromatic polyamine, a compound having quinone structure, tetracyanoquinodimethane and tetracyanoethylene.

4. An electroluminescent device according to claim 1, wherein said electroluminescent organic compound and the organic compound different in electronegativity therefrom are mixed at a molar ratio of 10/1 to 1/10.

5. An electroluminescent device according to claim 1, wherein said luminescent layer has a thickness of 0.01 to 1 μm.

6. An electroluminescent device comprising a luminscent layer of double-layer structure and a pair of electrodes, wherein a first layer of the luminescent layer comprises a mixed Langmuir-Blodgett monomolecular film, or built-up film thereof, comprising a first eletroluminescent organic compound and a first organic compound and a second layer of the luminescent layer comprises a mixed Langmuir-Blodgett monomolecular film, or a built-up film thereof, comprising a second electroluminscent organic compound and a second organic compound; said first electroluminescent organic compound being electron-acceptable relative to said second layer; said first organic compound being electron-acceptable relative to said first electroluminscent organic compound; said second electroluminscent organic compound being electron-donative relative to said first layer; and said second organic compound being electron-donative relative to said second electroluminescent organic compound.

7. An electroluminscent device according to claim 6, wherein said electrode pair consists of a transparent electrode and a back electrode, and the first layer of the luminescent layer is faced to the transparent electrode.

8. An electroluminescent device according to claim 6, wherein said first or second electroluminescent organic compuond is represented by the formula:

$$[(X-R_1)_m Z]_n - \phi - R_2$$

wherein X and R$_2$ each represent hydrogen, halogen, an alkoxy group, a alkyl ether group, a nitro group; a carboxyl group, a sulfonic acid group, a phosphoric acid group, a silicic acid group, a primary to tertiary amino group, and a metal salt thereof, a primary to tertiary amine salt or an acid salt thereof; an ester group, a sulfamide group, an amide group, an imino group, a quaternary amino group and a salt thereof, a hydroxyl group; R$_1$ represents a C$_4$–C$_{30}$ alkyl group; m is 1 or 2; n is an integer of 1 to 4; Z is direct bonding or —O—, —S—, —NR$_3$—, —CH$_2$NR$_3$—, —SO$_2$NR$_3$—, —CO—, —COO— (R$_3$ is hydrogen, an alkyl group or an aryl group); and $\phi$ is a fused polycyclic aromatic hydrocarbon, p-terphenyl, 2,5-diphenyloxazole, 1,4-bis(2-methylstyryl)-benzene, xanthine, coumarine, acridine, cyanine dye, benzophenone, phthalocyanine and metal complex thereof, porphyrin and a metal complex thereof, 8-hydroxyquinoline and a metal complex thereof, an organic ruthenium complex, an organic rare earth complex and a derivative of these compounds, a heterocyclic compound and a derivative thereof, aromatic polyamine, a compound having quinone structure, tetracyanoquinodimethane and tetracyanoethylene.

9. An electroluminescent device according to claim 6, wherein the first electroluminescent organic compound and the first organic compound in the first layer of the luminescent layer are mixed at a molar ratio of 10/1 to 100/1.

10. An electroluminescent device according to claim 6, wherein the second electroluminescent organic compound and the second organic compound in the second layer of the luminescent layer are mixed at a molar ratio of 10/1 to 100/1.

11. An electroluminescent device according to claim 6, wherein said luminescent layer has a thickness of 0.01 to 1 µm.

12. An electroluminescent device according to claim 6, wherein said luminescent layer comprises 4 to 400 built-up monomolecular films.

13. An electroluminescent device comprising a luminescent layer of a double-layer structure and a pair of electrodes, wherein a first layer of the luminescent layer comprises a mixed Langmuir-Blodgett monomolecular film, or built-up film thereof, comprising a first electroluminescent organic compound and a first organic compound, and a second layer of the luminescent layer comprises a mixed deposited film comprising a second electroluminescent organic compound and a second organic compound; said first electroluminescent organic compound being electron-acceptable relative to said second layer; said first organic compound being electron-acceptable relative to said first electroluminescent organic compound; said second electroluminescent organic compound being electron-donative relative to said first layer; and said second organic compound being electron-donative relative to said second electroluminescent organic compound.

14. An electroluminescent device according to claim 13, wherein said electrode pair consists of a transparent electrode and a back electrode, and the first layer of the luminescent layer is faced to the transparent electrode.

15. An electroluminescent device, according to claim 13, wherein said first or second electroluminescent organic compound is represented by the formula:

wherein X and $R_2$ each represent hydrogen, halogen, an alkoxy group, an alkyl ether group, a nitro group; a carboxyl group, a sulfonic acid group, a phosphoric acid group, a silicic acid group, a primary to tertiary amino group, and a metal salt thereof, a primary to tertiary amine salt thereof or a acid salt thereof; an ester group, a sulfamide group, an amide group, an imino group, a quaternary amino group and a salt thereof, a hydroxyl group; $R_1$ represents a $C_4$-$C_{30}$ alkyl group; m is 1 or 2; n is an integer of 1 to 4; Z is direct bonding or —O—, —S—, —NR$_3$—, —CH$_2$NR$_3$—, —SO$_2$NR$_3$—, —CO—, —COO—($R_3$ is hydrogen, an alkyl group or an aryl group); and $\phi$ is a fused polycyclic aromatic hydrocarbon, p-terphenyl, 2,5-diphenyloxazole, 1,4-bis(2-methylstyryl)-benzene, xanthine, coumarine, acridine, cyanine dye, benzophenone, phthalocyanine and a metal complex thereof, a porphyrin and a metal complex thereof, 8-hydroxyquinoline and a metal complex thereof, an organic ruthenium complex, an organic rare earth complex and a derivative of these compounds, a heterocyclic compound and a derivative thereof, an aromatic polyamine, a compound having quinone structure, tetracyanoquinodimethane and tetracyanoethylene.

16. An electroluminescent device according to claim 13, wherein the first electroluminescent organic compound and the first organic compound in the first layer of the luminescent layer are mixed at a molar ratio of 10/1 to 100/1.

17. An electroluminescent device according to claim 13, wherein the second electroluminescent organic compound and the second organic compound in the second layer of the luminescent layer are mixed at a molar ratio of 10/1 to 100/1

18. An electroluminescent device according to claim 13, wherein said luminscent layer has a thickness of 0.01 to 1 µm.

19. An electroluminescent device according to claim 13, wherein said first layer comprises 4 to 400 built-up monomolecular films.

20. An electroluminescent device according to claim 13, wherein the second layer has a thickness of 0.0 to 0.5 µm.

21. An electroluminescent device comprising a luminescent layer of a double layer structure and a pair of electrodes, wherein a first layer of the luminescent layer comprises a mixed deposited film comprising a first electroluminescent organic compound and a first organic compound and a second layer of the luminescent layer comprises a mixed Langmuir-Blodgett monomolecular film, or built-up film thereof, comprising a second electroluminescent organic compound and a second organic compound; said first electroluminescent organic compound being electron-acceptable relative to said second layer; said first organic compound being electron-acceptable relative to said first electroluminescent organic compound; said second electroluminscent organic compound being electron-donative relative to said first layer; and said second organic compound being electron-donative relative to said second electroluminescent organic compound.

22. An electroluminescent device according to claim 21, wherein said pair of electrodes consist of a transparent electrode and a back electrode, and the first layer of the luminescent layer is faced to the transparent electrode.

23. An electroluminescent device according to claim 21, wherein said first or second electroluminescent organic compound is represented by the formula:

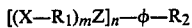

wherein X and $R_2$ each represent hydrogen, halogen, an alkoxy group, an alkyl ether group, a nitro group; a carboxyl group, a sulfonic acid group, a phosphoric acid group, a silicic acid group, a primary to tertiary amino group, and a metal salt thereof, a primary to tertiary amine salt thereof or an acid salt thereof; an ester group, a sulfamide group, an amide group, an imino group, a quaternary amino group and a salt thereof; a hydroxyl group; $R_1$ represents a $C_4$-$C_{30}$ alkyl group; m is 1 or 2; n is an integer of 1 to 4; Z is direct bonding or —O—, —S—, —NR$_3$—, —CH$_2$NR$_3$—, —SO$_2$NR$_3$—, —CO—, —COO— ($R_3$ is hydrogen, an alkyl group or an aryl group); and $\phi$ is a fused polycyclic aromatic hydrocarbon, p-terphenyl, 2,5-diphenyloxazole, 1,4-bis(2-methylstyryl)-benzene, xanthine, coumarine, acridine, cyanine dye, benzophenone, phthalocyanine and a metal complex thereof, porphyrin and a metal complex thereof, 8-hydroxyquinoline and a metal complex thereof, an organic ruthenium complex, an organic rare earth complex and a derivative of these compounds, a heterocyclic compound and a derivative thereof, an aromatic polyamine, a compound having quinone structure, tetracyanoquinodimethane and tetracyanoethylene.

24. An electroluminescent device according to claim 21, wherein, the first electroluminescent organic compound and the first organic compound in the first layer of the luminescent layer are mixed at a molar ratio of 10/1 to 100/1.

25. An electroluminescent device according to claim 21, wherein the second electroluminescent organic compound and the second organic compound in the second layer of the luminescent layer are mixed at a molar ratio of 10/1 to 100/1.

26. An electroluminescent device according to claim 21, wherein said luminescent layer has a thickness of 0.01 to 1 $\mu$m.

27. An electroluminescent device according to claim 21, wherein the first layer of the luminescent layer has a thickness of 0.01 to 0.5 $\mu$m.

28. An electroluminescent device, according to claim 21, wherein said second layer comprises 4 to 400 built-up monomolecular films.

29. An electroluminescent device comprising a luminescent layer of a double-layer structure and a pair of electrodes, wherein a first layer of the luminescent layer comprises a mixed monomolecular film, or built-up film thereof, comprising a first electroluminescent organic compound and a first organic compound, and a second layer of the luminescent layer comprises a mixed monomolecular film, or a built-up film thereof, of a second electroluminescent organic compound and a second organic compound; said first electroluminescent organic compound being electron-acceptable relative to said second layer; said first oragnic compound being electron-acceptable relative to said first electroluminescent organic compound; said second electroluminescent organic compound being electron-donative relative to said first layer; and said second organic compound being electron-donative relative to said second electroluminescent organic compound.

30. An electroluminscent device comprising a luminescent layer of a double-layer structure and a pair of eletrodes, wherein a first layer of the luminescent layer comprises a mixed monomolecular film, or a built-up film thereof, comprising a first electroluminescent organic compound and a first organic compound, and a second layer of the luminescent layer comprises a mixed deposited film of a second electroluminescent organic compound and a second organic compound; said first electroluminescent organic compound being electron-acceptable relative to said second layer; said first organic compound being electron-acceptable relative to said first electroluminescent organic compound; said second electroluminescent organic compound being electron-donative relative to said first layer; and said second organic compound being electron-donative relative to said second electroluminescent organic compound.

31. An electroluminescent device comprising a luminescent layer of a double-layer structure and a pair of electrodes, wherein a first layer of the luminescent layer comprises a mixed deposited film of a first electroluminescent organic compound and a first organic compound, and a second layer of the luminescent layer comprises a mixed monomolecular film, or a built-up film thereof, comprising a second electroluminescent organic compound and a second organic compound; said first electroluminescent organic compound being electron-acceptable relative to said second layer; said first organic compound being electron-acceptable relative to said first electroluminescent organic compound; said second electroluminescent organic compound being electron-donative relative to said first layer; and said second organic compound being electron-donative relative to said second electroluminescent organic compound.

* * * * *

UNITED STATES PATENT AND TRADEMARK OFFICE
CERTIFICATE OF CORRECTION

PATENT NO. : 4,725,513                    Page 1 of 2

DATED      : February 16, 1988

INVENTOR(S) : KEN EGUCHI, ET AL.

It is certified that error appears in the above-identified patent and that said Letters Patent is hereby corrected as shown below:

COLUMN 27

Line 62, "$NR_3-$," should read ---$NR_3-$,--.

COLUMN 28

Line 15, "lumins-" should read --lumines---.
    Line 19, "eletrolu-" should read --electrolu---.
    Line 21, "pound" should read --pound,--.
    Line 24, "troluminscent" should read --troluminescent--.
    Line 28, "electroluminscent" should read --electroluminescent--.
    Line 29, "electroluminscent" should read --electroluminescent--.
    Line 34, "electroluminscent" should read --electroluminescent--.
    Line 40, "compuond" should read --compound--.
    Line 45, "a" (first occurence) should read --an--.

COLUMN 29

Line 39, "device," should read --device--.
    Line 50, "a" should read --an--.

COLUMN 30

Line 12, "luminscent" should read --luminescent--.
    Line 18, "0.0" should read --0.1--.
    Line 21, "double layer" should read --double-layer--.

UNITED STATES PATENT AND TRADEMARK OFFICE
CERTIFICATE OF CORRECTION

PATENT NO. : 4,725,513

DATED : February 16, 1988

INVENTOR(S) : KEN EGUCHI, ET AL.

It is certified that error appears in the above-identified patent and that said Letters Patent is hereby corrected as shown below:

COLUMN 31

Line 6, "wherein," should read --wherein--.
    Line 21, "device," should read --device--.
    Line 35, "oragnic" should read --organic--.

COLUMN 32

Line 3, "electroluminscent" should read
        --electroluminescent--.

Signed and Sealed this

Twenty-sixth Day of July, 1988

Attest:

DONALD J. QUIGG

Attesting Officer      Commissioner of Patents and Trademarks